(12) United States Patent
Williams et al.

(10) Patent No.: US 11,014,528 B2
(45) Date of Patent: May 25, 2021

(54) ENERGY ABSORPTION FOR D-RING ATTACHMENT BRACKET

(71) Applicant: Toyota Motor Engineering & Manufacturing North America, Inc., Plano, TX (US)

(72) Inventors: James M. Williams, Ypsilanti, MI (US); Todd Rupert Muck, Fowlerville, MI (US); Yuji Yagi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 77 days.

(21) Appl. No.: 16/389,433

(22) Filed: Apr. 19, 2019

(65) Prior Publication Data
US 2020/0331426 A1 Oct. 22, 2020

(51) Int. Cl.
*B60R 22/28* (2006.01)
*B60R 22/18* (2006.01)

(52) U.S. Cl.
CPC .............. *B60R 22/28* (2013.01); *B60R 22/18* (2013.01); *B60R 2022/1818* (2013.01)

(58) Field of Classification Search
CPC ......... B60R 22/28; B60R 22/18; B60R 22/24; B60R 2022/1818; B60R 2022/1837; B60R 22/03
See application file for complete search history.

(56) References Cited

U.S. PATENT DOCUMENTS

| | | | | | |
|---|---|---|---|---|---|
| 3,836,172 A | * | 9/1974 | Hildebrandt | ............ | B60R 22/24 280/801.1 |
| 4,165,944 A | * | 8/1979 | Sunasky | ............... | A47B 57/402 403/254 |
| 4,191,400 A | * | 3/1980 | Smith | ..................... | B60R 22/24 280/808 |
| 4,322,097 A | * | 3/1982 | Provensal | ............... | B60R 22/32 280/803 |
| RE31,106 E | * | 12/1982 | Pufpaff | ................... | F16B 21/02 403/146 |
| 4,473,243 A | * | 9/1984 | Ogawa | .................... | B60R 22/24 280/808 |
| 4,556,255 A | * | 12/1985 | Kawai | ................... | B60R 22/203 280/801.2 |
| 4,682,790 A | * | 7/1987 | Katsuno | .................. | B60R 22/20 280/801.1 |
| 4,702,491 A | * | 10/1987 | Meyer | .................... | B60R 22/26 280/801.1 |

(Continued)

*Primary Examiner* — Paul N Dickson
*Assistant Examiner* — Timothy Wilhelm
(74) *Attorney, Agent, or Firm* — Christopher G. Darrow; Darrow Mustafa PC

(57) ABSTRACT

A vehicle D-ring attachment bracket assembly includes a vehicle D-ring attachment bracket having a first mounting hole, a second mounting hole, and a D-ring bolt hole positioned between the first and second mounting holes. The assembly also includes a first energy absorber attached to the attachment bracket. The first energy absorber includes a first energy absorber first hole positioned coaxially or substantially coaxially with the bracket first mounting hole, and a first energy absorber second hole positioned coaxially or substantially coaxially with the bracket second mounting hole.

6 Claims, 3 Drawing Sheets

(56) References Cited

U.S. PATENT DOCUMENTS

| | | | | |
|---|---|---|---|---|
| 4,729,581 A * | | 3/1988 | Ono | B60R 22/20 200/61.58 B |
| 4,776,611 A * | | 10/1988 | Tamura | B60R 22/06 280/801.2 |
| 4,840,405 A * | | 6/1989 | Escaravage | B60R 22/201 280/801.2 |
| 4,867,477 A * | | 9/1989 | Escaravage | B60R 22/201 280/801.2 |
| 4,871,192 A * | | 10/1989 | Escaravage | B60R 22/201 280/801.2 |
| 4,940,254 A * | | 7/1990 | Ueno | B60R 22/20 280/801.2 |
| 4,982,981 A * | | 1/1991 | Fourrey | B60R 22/202 248/222.52 |
| 5,016,916 A * | | 5/1991 | Yokote | B60R 22/20 280/801.2 |
| 5,048,866 A * | | 9/1991 | Hirasawa | B60R 22/24 280/803 |
| 5,096,224 A * | | 3/1992 | Murakami | B60R 22/24 280/801.1 |
| 5,149,136 A * | | 9/1992 | Maekawa | B60R 22/202 280/801.2 |
| 5,176,402 A * | | 1/1993 | Coulon | B60R 22/24 280/807 |
| 5,280,959 A * | | 1/1994 | Nanbu | B60R 22/203 280/801.1 |
| 5,415,430 A * | | 5/1995 | Valasin | B60R 22/22 280/801.1 |
| 5,427,412 A * | | 6/1995 | Staniszewski | B60R 22/24 248/221.12 |
| 5,437,475 A * | | 8/1995 | Sugimoto | B60R 22/203 280/801.2 |
| 5,476,286 A * | | 12/1995 | Delfino | B60R 22/20 280/801.2 |
| 5,529,344 A * | | 6/1996 | Yasui | B60R 21/055 280/808 |
| 5,556,171 A * | | 9/1996 | Busch | B60R 22/20 280/808 |
| 5,590,907 A * | | 1/1997 | McQueen, II | B60R 22/24 280/801.1 |
| 5,603,527 A * | | 2/1997 | Bee | B60R 22/24 280/801.1 |
| 5,692,780 A * | | 12/1997 | Yasui | B60R 21/055 280/801.2 |
| 5,791,687 A * | | 8/1998 | Gotou | B60R 22/201 280/805 |
| 5,906,396 A * | | 5/1999 | Biller | B60R 22/201 280/748 |
| 5,951,046 A * | | 9/1999 | Hosoda | B60R 22/201 280/801.1 |
| 6,032,982 A * | | 3/2000 | Pakulsky | B60R 22/201 280/801.2 |
| 6,234,529 B1 * | | 5/2001 | Ellison | B60R 22/24 280/808 |
| 6,250,681 B1 * | | 6/2001 | Takahashi | B60R 22/28 280/801.2 |
| 6,276,720 B1 * | | 8/2001 | Saito | B60R 22/202 280/801.2 |
| 6,364,359 B1 * | | 4/2002 | Dietrich | B60R 22/201 280/801.2 |
| 6,431,603 B2 * | | 8/2002 | Dietrich | B60R 21/055 280/801.1 |
| 6,460,890 B2 * | | 10/2002 | Dietrich | B60R 21/055 280/801.2 |
| 6,478,334 B1 * | | 11/2002 | Desmarais | B60R 21/055 280/805 |
| 6,485,056 B2 * | | 11/2002 | Dietrich | B60R 21/06 280/805 |
| 6,662,670 B2 * | | 12/2003 | Clark | B60R 22/18 73/862.391 |
| 6,733,041 B2 * | | 5/2004 | Arnold | B60R 22/203 280/801.2 |
| 6,749,223 B2 * | | 6/2004 | Kazuo | B60R 22/20 280/727 |
| 6,749,224 B1 * | | 6/2004 | Stojanovski | B60R 21/055 280/801.1 |
| 6,808,225 B2 * | | 10/2004 | Moriyama | B60J 5/043 296/146.6 |
| 6,860,671 B2 * | | 3/2005 | Schulz | B60R 22/24 280/801.1 |
| 6,902,227 B2 * | | 6/2005 | Keller | B60R 21/04 296/187.05 |
| 6,935,701 B1 * | | 8/2005 | Arnold | B60R 22/202 280/801.2 |
| 7,021,662 B2 * | | 4/2006 | Hoffmann | B60R 22/202 280/801.2 |
| 7,131,669 B2 * | | 11/2006 | Morita | B60R 22/24 280/808 |
| 7,156,198 B2 * | | 1/2007 | Nishide | B60N 2/002 180/273 |
| 7,237,799 B2 * | | 7/2007 | Clute | B60R 21/18 280/733 |
| 7,309,078 B2 * | | 12/2007 | Nagata | B60R 21/213 280/728.2 |
| 7,367,590 B2 * | | 5/2008 | Koning | B60R 22/18 280/801.2 |
| 7,445,244 B2 * | | 11/2008 | Taylor | B60R 22/26 280/801.2 |
| 7,543,852 B2 * | | 6/2009 | Murthy | B60R 22/20 248/297.31 |
| 7,802,819 B2 * | | 9/2010 | Ng | B60R 22/18 280/808 |
| 7,971,907 B2 * | | 7/2011 | Kranz | B60R 22/18 280/801.1 |
| 8,136,841 B2 * | | 3/2012 | Omiya | B60R 22/24 280/801.2 |
| 8,215,189 B2 * | | 7/2012 | Maeta | B60N 2/002 73/862.391 |
| 8,408,599 B2 * | | 4/2013 | Strnad | B60R 22/18 280/801.1 |
| 8,678,438 B2 * | | 3/2014 | You | B60R 21/055 280/801.2 |
| 8,678,439 B2 * | | 3/2014 | Marziani | B60R 22/18 280/805 |
| 8,740,250 B1 * | | 6/2014 | Patel | B60R 22/18 280/801.1 |
| 8,807,598 B2 * | | 8/2014 | Strnad | B60R 22/18 280/808 |
| 8,950,782 B2 * | | 2/2015 | Dobruia | B60R 22/26 280/808 |
| 8,985,632 B1 * | | 3/2015 | Heckman | B60R 22/24 280/801.2 |
| 8,991,866 B2 * | | 3/2015 | Osterhout | B60R 13/025 280/801.2 |
| 9,050,918 B2 * | | 6/2015 | Haner | B60R 21/055 |
| 9,499,121 B2 * | | 11/2016 | Dingman | B60R 22/28 |
| 9,610,918 B2 * | | 4/2017 | Hayashi | B60R 22/18 |
| 9,623,836 B2 * | | 4/2017 | Kujawa | B60R 22/1952 |
| 9,643,566 B2 * | | 5/2017 | Bok | B60R 22/24 |
| 9,718,435 B2 * | | 8/2017 | Harada | A44B 11/2546 |
| 9,776,590 B1 * | | 10/2017 | Poser | B60R 21/055 |
| 9,809,193 B2 * | | 11/2017 | Marriott | B60R 22/203 |
| 9,873,405 B2 * | | 1/2018 | Chandrakeerthy | B60R 22/26 |
| 9,919,744 B2 * | | 3/2018 | Gonda | F16B 5/02 |
| 9,944,253 B2 * | | 4/2018 | Lee | B60R 22/24 |
| 10,059,295 B2 * | | 8/2018 | Sudo | B60R 21/04 |
| 10,266,269 B2 * | | 4/2019 | Hainsworth | B60R 22/1951 |
| 2003/0094804 A1 * | | 5/2003 | Yakata | B60R 22/24 280/801.1 |
| 2005/0077718 A1 * | | 4/2005 | Desmarais | B60R 22/24 280/808 |
| 2008/0018088 A1 * | | 1/2008 | Gray | B60R 22/03 280/808 |
| 2008/0030063 A1 * | | 2/2008 | Tabata | B60R 22/201 297/468 |
| 2008/0136141 A1 * | | 6/2008 | Gray | B60R 22/202 280/727 |

* cited by examiner

ENERGY ABSORPTION FOR D-RING ATTACHMENT BRACKET

TECHNICAL FIELD

The present invention relates to brackets used to attach a D-ring to a portion of a vehicle interior, for supporting a portion of a seat belt, for example.

BACKGROUND

A D-ring may be attached to a portion of a vehicle interior for supporting a portion of a seat belt. The D-ring may be attached to the vehicle interior using a bracket bolted or otherwise secured to a portion of the interior. Forces exerted on the D-ring during a collision event may be transmitted to the bracket, stressing the bracket and the attachment of the bracket to the vehicle. It is desirable for the bracket to help absorb some of the energy transmitted to the D-ring during the collision event.

SUMMARY

In one aspect of the embodiments described herein, a vehicle D-ring attachment bracket assembly includes a vehicle D-ring attachment bracket having a first mounting hole, a second mounting hole, and a D-ring bolt hole positioned between the first and second mounting holes. The assembly also includes a first energy absorber attached to the attachment bracket. The first energy absorber includes a first energy absorber first hole positioned coaxially or substantially coaxially with the bracket first mounting hole, and a first energy absorber second hole positioned coaxially or substantially coaxially with the bracket second mounting hole.

DETAILED DESCRIPTION

Figure 1A:
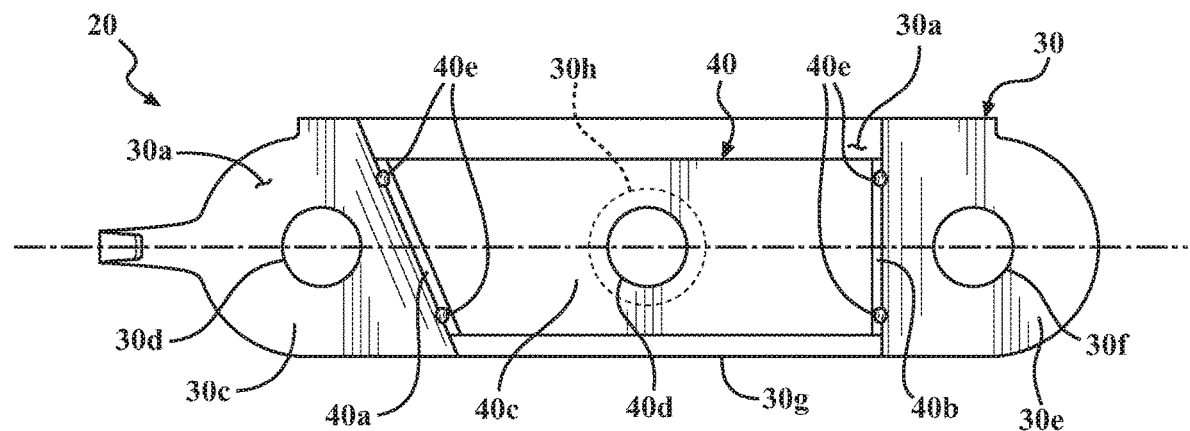
FIG. 1A is schematic plan view of a prior art vehicle D-ring attachment bracket assembly.

Embodiments described herein relate to a vehicle D-ring attachment bracket assembly including a vehicle D-ring attachment bracket having a first mounting hole, a second mounting hole, and a D-ring bolt hole positioned between the first and second mounting holes. The assembly also includes one or more energy absorbers attached to the attachment bracket. The energy absorbers each include an associated energy absorber first hole positioned coaxially or substantially coaxially with the bracket first mounting hole, and an associated energy absorber second hole positioned coaxially or substantially coaxially with the bracket second mounting hole. A force exerted on the D-ring is transmitted to the energy absorber(s), causing deformation of the energy absorber(s). The energy-absorbers aid in absorbing the energy applied to the bracket, thereby reducing the stresses imposed on the attachment bracket. Multiple energy absorber(s) may be attached to portions of the attachment bracket to increase or otherwise tailor the energy absorption capability of the bracket assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements.

Figure 1B:
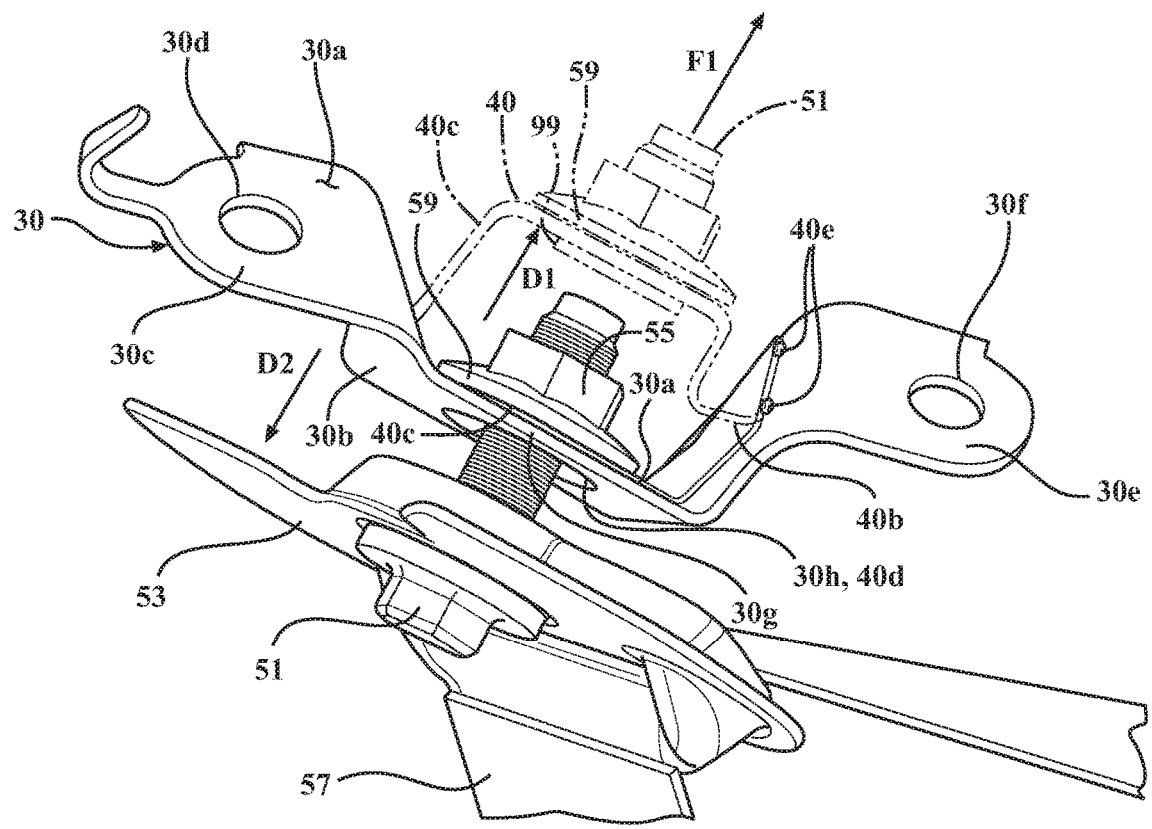
FIG. 1B is the prior art vehicle D-ring attachment bracket assembly of FIG. 1A shown installed in a vehicle, and showing the bracket assembly both prior to and after application of a load which deforms an energy absorber attached to a bracket of the prior art bracket assembly.

FIG. 1A is schematic plan view of a prior art vehicle D-ring attachment bracket assembly 20. FIG. 1B is the prior art vehicle D-ring attachment bracket assembly of FIG. 1A shown installed in a vehicle, and showing the bracket assembly both prior to and after application of a load which deforms an energy absorber 40 (described below) attached to the prior art bracket assembly. Bracket assembly 20 may include a D-ring vehicle attachment bracket 30 having a first face 30a and a second face 30b residing opposite the first face 30a. Portions of the bracket 30 may be formed as shown or as otherwise required for mounting to a particular portion of the vehicle.

Bracket 30 may also have a first end portion 30c including a first mounting hole 30d for mounting the bracket assembly 20 to a portion (for example, a pillar or wall) of a vehicle (not shown). Bracket 30 may also have a second end portion 30e residing opposite the first end portion 30c. The second end portion 30e may include a second mounting hole 30f for mounting the bracket assembly 20 to the portion of the vehicle. A body portion 30g may extend between the first and second mounting holes 30d and 30f. The body portion 30g may include a bolt clearance hole 30h positioned therealong between the first and second mounting holes 30d, 30f. Hole 30h may be configured to receive therethrough a bolt (such as bolt 51 shown in FIG. 1B, for example) by which the D-ring 53 may be mounted to the bracket assembly 20. For purposes described herein, the D-ring bolt hole 30h may be considered to be positioned between the first and second mounting holes 30d, 30f of the bracket 30 when at least a portion of the D-ring bolt hole 30h lies along a line extending along the bracket and connecting centers of the first and second mounting holes 30d, 30f. D-ring vehicle attachment bracket 30 may be formed from any suitable material or materials. In one or more arrangements, the vehicle D-ring attachment bracket 30 is formed from a steel or other metallic alloy.

Bracket assembly 20 may also include the energy absorber 40, which may be secured to the D-ring attachment bracket 30 along the first face 30a of the bracket 30. Energy absorber 40 may have a first end portion 40a, a second end portion 40b opposite the first end portion 40a, and a body portion 40c extending between the first and second end portions 40a, 40b. Energy absorber body portion 40c may also include an associated through hole 40d formed therein. Energy absorber hole 40d may be configured to receive therein D-ring bolt 51 usable for attaching the D-ring 53 to the bracket assembly 20. Energy absorber hole 40d may be structured to be coaxial or substantially coaxial with the bracket hole 30h when the energy-absorber is attached to the bracket. As used herein, the term "substantially" includes exactly the term it modifies and slight variations therefrom. Thus, for example, the term "substantially coaxial" means exactly coaxial and slight variations therefrom. In the examples described herein, slight variations in the dimensions described can include values within manufacturing or fabrication tolerances applicable to the components being fabricated and the materials and manufacturing processes being used to produce the components. The energy absorber hole 40d may have a smaller diameter than the bracket hole 30h. More specifically, the energy absorber hole 40d may be large enough to allow bolt 51 to pass therethrough, but small enough to prevent passage therethrough of a retention member 99 attached to the bolt 51 opposite a face of the energy absorber facing the bracket hole 30h.

The energy absorber 40 may be attached at its first and second end portions 40a, 40b to D-ring attachment bracket 30 by welds 40e or by any other means suitable for maintaining the end portions 40a, 40b of the energy absorber 40 attached to the D-ring attachment bracket 30 during application of a load to the D-ring attachment bracket 30 sufficient to deform the energy absorber 40 as shown by the phantom lines in FIG. 1B. The energy absorber 40 may be shaped so as to conform to the surface contours of bracket first face 30a when the energy absorber 40 is attached to the bracket 30. A load-distributing washer 59 (FIG. 1B) may be positioned in contact with the energy absorber 40, between the energy absorber 40 and a nut 55 applied to the bolt 51. Energy absorber 40 may be formed from any suitable material. In one or more arrangements, the energy absorber 40 is formed from a metallic material, such as a steel, for example. In particular arrangements, the energy absorber 40 may be formed from 440 stainless steel.

A threaded washer or similar retention member 99 may be applied to bolt 51 on a side of the energy absorber body portion 40c opposite a side on which nut 55 and washer 59 reside. Retention member 99 is configured to be able to pass through bracket opening 30h from either direction. Retention member 99 is applied to bolt 51 so as to contact a surface of the energy absorber body portion 40c residing opposite the face of the energy absorber body portion 40c contacted by washer 59, so that the energy absorber body portion 40c is in direct contact with, and is clamped between, the washer 59 and the retention member 99. Retention member 99 is secured to bolt 51 in this location so as to maintain energy absorber body portion 40c clamped between the washer 59 and the retention member 99. In one or more arrangements, the retention member 99 is sized to reside within the hole 30h prior to application of a deformation load to energy absorber 40.

Referring to FIG. 1B, the shape of the energy absorber 40 (conforming to the shape of bracket 30) prior to application of a force to the bracket assembly 20 is shown in solid lines. The deformed shape of the energy absorber 40 after application of a sufficient force to the energy absorber 40 is shown in phantom lines. The bracket assembly 20 may be attached to the vehicle using bolts (not shown) applied through the first and second mounting holes 30d, 30f of the bracket 30. The D-ring 53 may be attached to the bracket 30 by D-ring attachment bolt 51. The D-ring 53 may also be attached or otherwise coupled to an element (such as a seat belt 57) capable of exerting a force on the D-ring 53, for example, during a collision of the vehicle. As seen from FIG. 1B, attachment bracket first face 30a may be configured to face in a direction D1 away from D-ring 53 when the D-ring 53 is mounted to bracket assembly 20, and attachment bracket second face 30b may be configured to face in a direction D2 toward the D-ring 53 when the D-ring 53 is mounted to bracket assembly 20.

Referring to FIG. 1B, during operation, a force F1 may be exerted on the D-ring attachment bolt 51. The force F1 may act in a direction away from the bracket assembly 20, causing a portion of the energy absorber 40 to plastically deform from the shape shown in solid lines in FIG. 1B to the shape shown in phantom lines in FIG. 1B. The energy absorber 40 may deform through stretching and/or bending of the portions of the energy-absorber body portion 40c residing between the energy-absorber D-ring bolt hole 40d and the energy-absorber first end portion 40a attached to the bracket 30, and between the energy-absorber D-ring bolt hole 40d and the energy-absorber second end portion 40b attached to the bracket 30. This stretching and/or bending of the energy-absorber aids in absorbing the forces acting on the bracket assembly 20 as a whole, thereby increasing the energy-absorbing capability of the bracket assembly 20 as forces acting through the D-ring bolt 51 deform the bracket assembly 20.

Figure 2A:
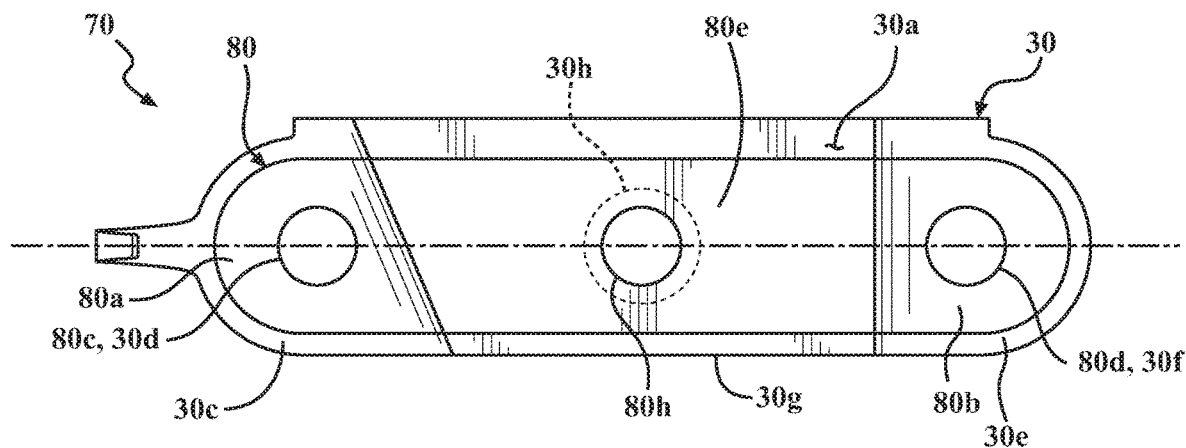
FIG. 2A is schematic plan view of a vehicle D-ring attachment bracket assembly including an energy absorber in accordance with an embodiment of the present invention.
Figure 2B:
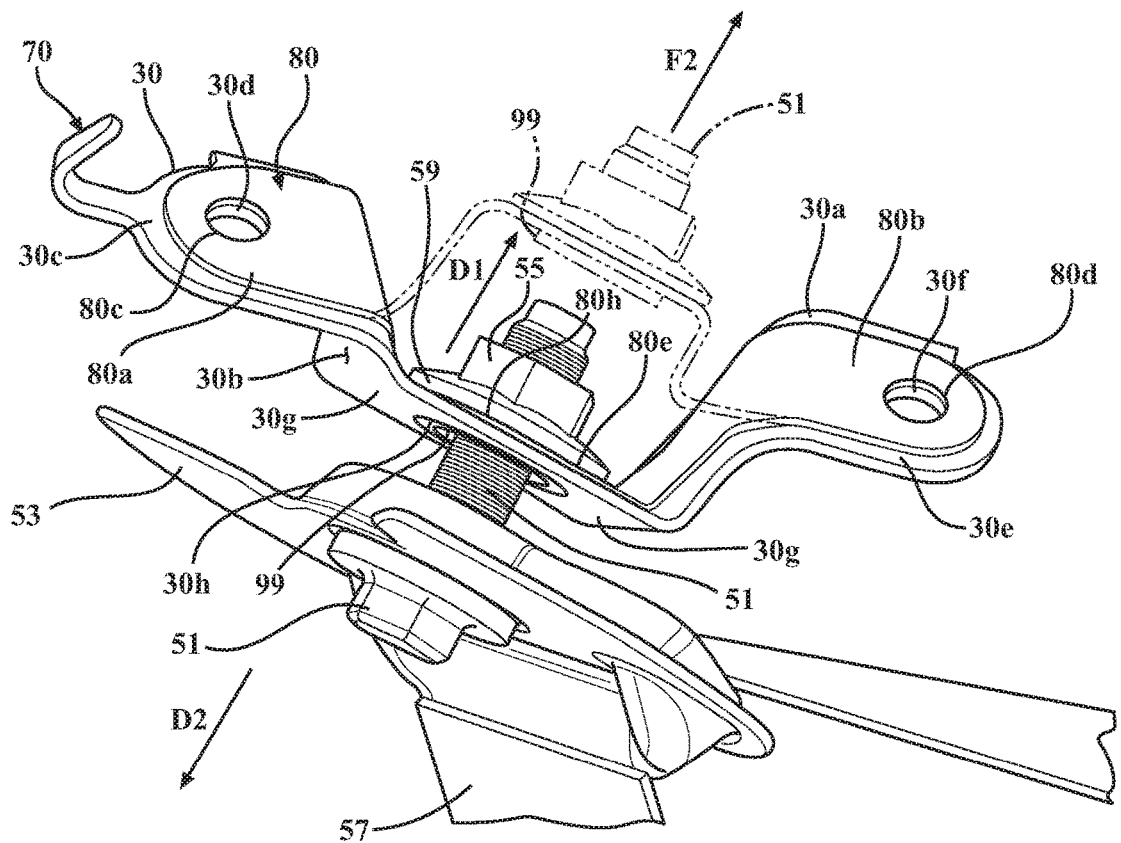
FIG. 2B is the vehicle D-ring attachment bracket assembly of FIG. 2A shown installed in a vehicle, and showing the bracket assembly both prior to and after application of a load which deforms the energy absorber.

FIG. 2A is schematic plan view of a vehicle D-ring attachment bracket assembly 70 in accordance with an embodiment of the present invention. FIG. 2B is the vehicle D-ring attachment bracket assembly of FIG. 2A shown installed in a vehicle, and showing the bracket assembly both prior to and after application of a load which deforms an energy absorber 80 attached to the bracket 30. Bracket assembly 70 may include a D-ring vehicle attachment bracket 30 structured as previously described. Bracket assembly 70 may also include first energy absorber 80 attached or secured to the D-ring attachment bracket 30 along the first face 30a of the bracket 30. First energy absorber 80 may have a first end portion 80a and a second end portion 80b opposite the first end portion 80a.

First end portion 80a may include a first mounting hole 80c. The first energy absorber first mounting hole 80c may be configured to be coaxial or substantially coaxial with bracket first mounting hole 30d when the energy absorber 80 is attached to the bracket 30. The first energy absorber first mounting hole 80c may have the same diameter as the bracket first mounting hole 30d. Alternatively, the first energy absorber first mounting hole 80c may have any diameter which permits an attachment bolt or other fastener (not shown) to be inserted therethrough, for mounting the bracket assembly 70 to the vehicle. When the bracket assembly 70 is installed in the vehicle, the first energy absorber first end portion 80a may be attached to the bracket 30 by the bolt or other fastener (not shown) extending through the first energy absorber first mounting hole 80c and the bracket first mounting hole 30d, so that the first energy absorber first end portion 80a is in direct, intimate contact with the bracket 30 around the hole 30d.

The first energy absorber second end portion 80b may include a second mounting hole 80d. The first energy absorber second mounting hole 80d may be configured to be coaxial or substantially coaxial with bracket second mounting hole 30f when the energy absorber 80 is attached to the bracket 30. The first energy absorber second mounting hole 80d may have the same diameter as the bracket second mounting hole 30f. Alternatively, the first energy absorber second mounting hole 80d may have any diameter which permits an attachment bolt to be inserted therethrough, for mounting the bracket assembly 70 to the vehicle. When the bracket assembly 70 is installed in the vehicle, the first energy absorber second end portion 80*b* may be directly attached to the bracket 30 by the bolt or other fastener extending through the first energy absorber second mounting hole 80*d* and the bracket second mounting hole 30*f*, so that the first energy absorber second end portion 80*b* is in direct, intimate contact with the bracket around the hole 30*f*.

First energy absorber 80 may also have a body portion 80*e* extending between the first energy absorber first and second mounting holes 80*c*, 80*d*. First energy absorber body portion 80*e* may also include an associated through hole 80*h* formed therein. Hole 80*h* may be configured to receive D-ring bolt 51 therethrough, for attaching the D-ring 53 to the bracket assembly 70. For purposes described herein, the first energy absorber D-ring bolt hole 80*h* may be considered to be positioned between the first and second mounting holes 80*c*, 80*d* of the energy absorber 80 when at least a portion of the D-ring bolt hole 80*h* lies along an axis extending along the energy absorber 80 and connecting centers of the first and second mounting holes 80*c*, 80*d*.

The first energy absorber hole 80*h* may have a smaller diameter than the bracket hole 30*h*. More specifically, the energy absorber hole 80*d* may be large enough to allow bolt 51 to pass therethrough, but small enough to prevent passage therethrough of the retention member 99 previously described, which is attached to the bolt 51 opposite a face of the energy absorber facing the bracket hole 30*h*. The energy absorber 80 may be shaped so as to conform to the surface contours of bracket first face 30*a* when the energy absorber 80 is attached to the bracket 30. The load-distributing washer 59 may be positioned in contact with the first energy absorber 80, between the first energy absorber 80 and a nut 55 applied to the bolt 51. First energy absorber 80 may be formed from any suitable material. In one or more arrangements, the first energy absorber 80 is formed from a metallic material, such as a steel, for example. In particular arrangements, the first energy absorber 80 may be formed from 440 stainless steel.

For purposes of securing the first energy-absorber 80 to the bracket 30 during transport and installation of the bracket assembly 70, the first energy-absorber 80 may be attached to the bracket 30 using any suitable method (for example, welds, adhesive application, etc.) suitable for maintaining attachment of the first energy-absorber 80 in its end-use position with respect to the bracket 30 until the bracket assembly 70 is installed in the vehicle. Because the first energy-absorber 80 is attached to the bracket 30 by hardware applied through the first energy-absorber mounting holes 80*c*, 80*d*, any welds or other methods of attaching the first energy-absorber to the bracket 30 do not need to withstand impact or other operational loading applied to the bracket assembly 70 in order for the energy-absorber 80 to function as intended.

FIG. 2B is the vehicle D-ring attachment bracket assembly 70 of FIG. 2A shown installed in a vehicle, and both prior to and after application of a load which deforms the first energy-absorber 80. Referring to FIG. 2B, the first energy-absorber 80 shape (conforming to the shape of bracket 30) prior to application of a force to the assembly 70 is shown in solid lines. The deformed shape of a portion of the first energy-absorber 80 after application of a sufficient force to the first energy-absorber 80 is shown in phantom lines.

The bracket assembly 70 may be attached to the vehicle in the same manner described previously with respect to FIG. 1B, using bolts (not shown) applied to the first and second mounting holes 30*d*, 30*f* of the bracket 30 and corresponding coaxial mounting holes 80*c*, 80*d* of the first energy-absorber. The D-ring 53 may be attached to the bracket assembly 70 by D-ring attachment bolt 51. The D-ring 53 may also be directly attached or otherwise coupled to an element (such as seat belt 57) capable of exerting a force on the D-ring 53, for example, during a collision of the vehicle.

Referring to FIG. 2B, and as previously described with respect to FIGS. 1A and 1B, retention member 99 may be applied to bolt 51 on a side of the first energy absorber body portion 80*e* opposite a side on which nut 55 and washer 59 reside. Retention member 99 is configured to be able to pass through bracket opening 30*h* from either direction. Retention member 99 is applied to bolt 51 so as to contact a surface of the energy absorber body portion 80*e* residing opposite the face of the energy absorber body portion 80*e* contacted by washer 59, so that the energy absorber body portion 80*e* is in direct contact with, and is clamped between, the washer 59 and the retention member 99. Retention member 99 is secured to bolt 51 in this location so as to maintain energy absorber body portion 80*e* clamped between the washer 59 and the retention member 99. In one or more arrangements, the retention member 99 is sized to reside within the hole 30*h* prior to application of a deformation load to first energy absorber 80.

Referring to FIG. 2B, during operation, a force F2 may be exerted through the D-ring 53 or otherwise on the D-ring attachment bolt 51. The force F2 may act in a direction away from the bracket assembly 70, causing a portion of the first energy-absorber 80 to plastically deform from the state shown in FIG. 2B in solid lines to the state shown in phantom lines in FIG. 2B. During this process, the first energy-absorber 80 may plastically deform through stretching of the portions of the first energy-absorber body portion 80*e* residing between the energy-absorber D-ring bolt hole 80*h* and the energy-absorber first mounting hole 80*c* (where the first energy-absorber 80 is secured to the bracket 30 by mounting hardware), and also between the energy-absorber D-ring bolt hole 80*h* and the energy-absorber second mounting hole 80*d* (where the energy-absorber 80 is also secured to the bracket 30 by mounting hardware). The stretching of the first energy-absorber 80 in these regions aids in absorbing the forces acting on the bracket assembly 70 as a whole, thereby increasing the energy-absorbing capability of the bracket assembly 70 as forces acting through the D-ring bolt 51 deform the first energy-absorber 80.

The relatively greater length of the first energy-absorber 80 (with respect to energy-absorber 40 previously described) available for deformation provides a greater length of energy-absorber material to absorb the incident energy, allowing the stretched portions of the first energy-absorber 80 (between the D-ring bolt hole 80*h* and the mounting holes 80*c*, 80*d*) to stretch by relatively greater amounts than the portions of the prior art energy-absorber body portion 40*c* during force application. Thus, the first energy-absorber shown in FIGS. 2A-2B may absorb a relatively greater amount of energy before fracturing or failure. In addition, when the bracket assembly 70 has been installed in the vehicle, the ends of the first energy-absorber 80 are secured to the bracket 30 by bolts or other hardware applied through first energy-absorber mounting holes 80*c* and 80*d*, rather than by welds. Thus, due to the structure of the first energy-absorber 80, the connection between the first energy-absorber 80 and the bracket 30 during application of the deforming force may be more secure. Therefore, the functioning of the first energy-absorber 80 during loading is not dependent on the quality of any welds attaching the first energy-absorber 80 to the bracket 30.

Figure 3:
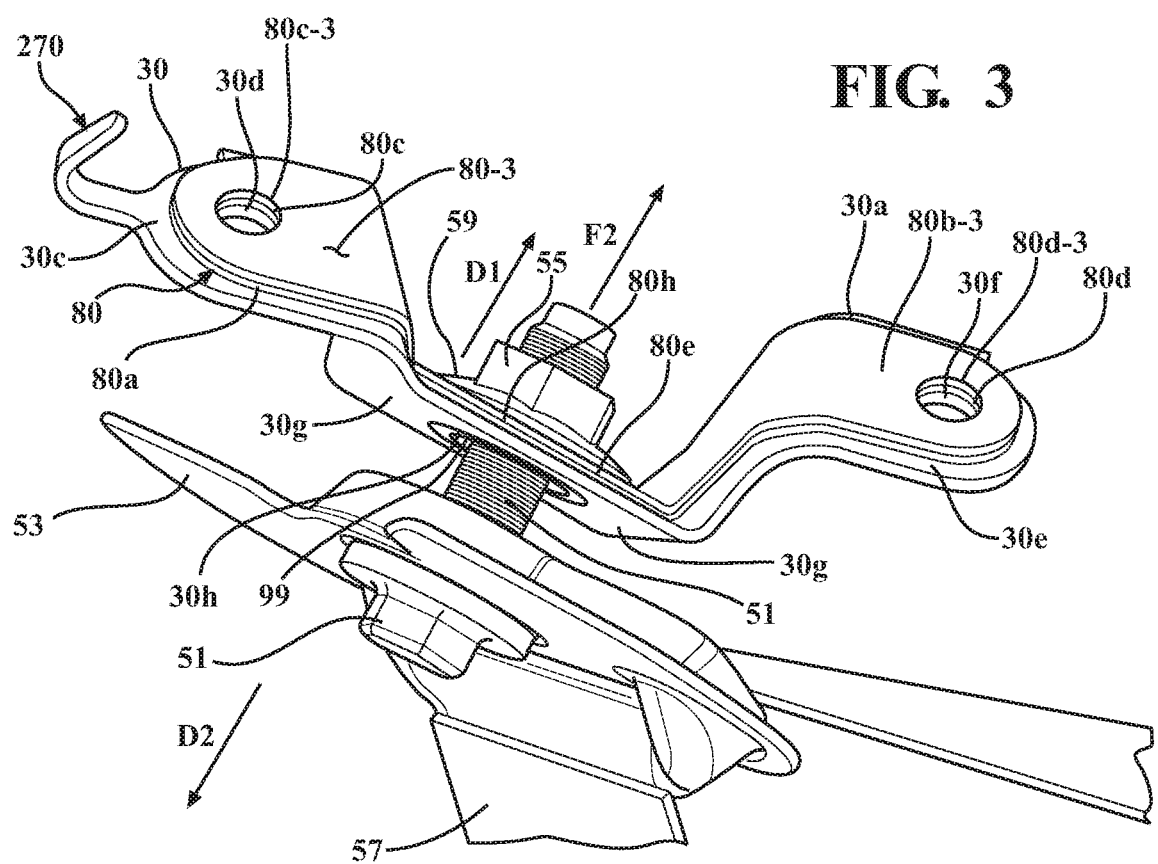
FIG. 3 is a schematic side perspective view of a vehicle D-ring attachment bracket assembly in accordance with another embodiment of the present invention.

FIG. 3 is a schematic side perspective view of a vehicle D-ring attachment bracket assembly 270 in accordance with another embodiment of the present invention. Bracket assembly 270 may include a D-ring vehicle attachment bracket 30 structured as previously described, and a first energy absorber 80 structured as previously described and secured to first face 30a of the bracket 30. In addition, bracket assembly 270 may include a second energy absorber 80-3 structured generally the same as first energy absorber 80 and secured to first energy absorber 80 by the same method used to secure the first energy absorber 80 to the bracket 30. This configuration permits at least one additional energy absorber 80-3 to be incorporated into the bracket assembly, thereby increasing the energy absorption capability of the bracket assembly 270. The additional energy absorber 80-3 may be secured to the first energy absorber 80 using any suitable means, and holes in the second energy absorber 80-2 may be aligned with corresponding holes formed in the bracket 30 and first energy absorber 80 as previously described, so that the second energy absorber 80-3 may also be deformed to absorb energy applied to the D-ring in the same manner as previously described with respect to FIG. 2B.

In one or more arrangements, the second energy-absorber 80-3 described herein may have a thickness which is the same or substantially the same as the thickness of the first energy-absorber 80. In other arrangements, the second energy-absorber 80-3 may have a thickness which is different from the thickness of the first energy-absorber 80. For example, a second energy-absorber 80-3 may have a target or design nominal material thickness which is different from the material thickness of first energy-absorber 80. The ability to vary the thicknesses and compositions of the energy absorbers and the ability to operatively couple multiple energy absorbers to the bracket 30 enables the energy absorption capability of the resulting bracket assembly to be adjusted to the requirements of a particular application.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle D-ring attachment bracket assembly comprising:
   a vehicle D-ring attachment bracket including a first mounting hole, a second mounting hole, and a D-ring bolt hole positioned along the attachment bracket between the first and second mounting holes;
   a first energy absorber attached to the attachment bracket, the first energy absorber including a first energy absorber first mounting hole positioned coaxially or substantially coaxially with the attachment bracket first mounting hole, a first energy absorber second mounting hole positioned coaxially or substantially coaxially with the attachment bracket second mounting hole, and a body portion extending between the first energy absorber first mounting hole and the first energy absorber second mounting hole, wherein the body portion is structured to be detachable from the D-ring attachment bracket responsive to a force exerted on the first energy absorber; and
   a second energy absorber attached to one of the first energy absorber and the attachment bracket such that the first energy absorber is interposed between the second energy absorber and the attachment bracket, the second energy absorber including a second energy absorber first mounting hole positioned coaxially or substantially coaxially with the attachment bracket first mounting hole, a second energy absorber second mounting hole positioned coaxially or substantially coaxially with the attachment bracket second mounting hole, and a body portion extending between the second energy absorber first mounting hole and the second energy absorber second mounting hole.

2. The attachment bracket assembly of claim 1 wherein the attachment bracket has a first face configured to face in a direction away from a D-ring when the D-ring is mounted to the attachment bracket, and wherein the first energy absorber is attached to the attachment bracket along the first face.

3. The attachment bracket assembly of claim 1 wherein the first energy absorber further comprises a first energy absorber D-ring bolt hole positioned coaxially or substantially coaxially with the attachment bracket D-ring bolt hole.

4. The attachment bracket assembly of claim 1 wherein the second energy absorber body portion is structured to be plastically deformable responsive to a force exerted on the first energy absorber body portion.

5. The attachment bracket assembly of claim 1 wherein the second energy-absorber has a thickness which is the same or substantially the same as the thickness of the first energy-absorber.

6. The attachment bracket assembly of claim 1 wherein the second energy-absorber has a thickness which is different from the thickness of the first energy-absorber.

* * * * *